United States Patent Office 2,819,201
Patented Jan. 7, 1958

2,819,201

MICROBIAL OXYGENATION OF STEROIDS IN THE 21 POSITION

Eugene L. Dulaney, Saskatoon, Saskatchewan, Canada, and William J. McAleer, Roselle, N. J., assignors to Merck & Co. Inc., Rahway, N. J., a corporation of New Jersey No Drawing. Application December 27, 1955
Serial No. 555,277

11 Claims. (Cl. 195—51)

This application is a continuation-in-part of our co-pending application Serial No. 396,318, filed December 4, 1953, now abandoned.

This invention relates to processes for introducing oxygen substituents into a steroid molecule and particularly to processes for preparing hydroxy steroids by subjecting desoxy steroids to the action of any oxygenating strain of microorganisms or their oxygenating enzymes.

The discovery of the remarkable therapeutic properties of cortisone, hydrocortisone and similar related compounds has stimulated wide interest in finding simpler and more economical methods of preparing such compounds. In the synthesis of these compounds, it is necessary to introduce a 21-hydroxy substituent. Although various methods have been developed for the synthesis of 21-hydroxy steroids, such processes are not entirely satisfactory and other methods for the commercial preparation of 21-hydroxy steroids in high yields have been sought.

Methods for effecting the oxygenation of steroids by the action of microorganisms are known in the art. For example, various actinomycetes are known to introduce oxygen into a number of positions of the steroid molecule. Similarly, various species of genera included in the order Mucorales also introduce oxygen in various positions of the steroid ring structure. Although microorganisms have been suggested for the oxygenation of steroids in various positions of the steroid nucleus, heretofore none of the microorganisms reported have caused the oxygenation to take place in a side chain attached to the steroid nucleus.

A primary object of this invention is to produce oxygenated steroids by fermentation processes. A related object is to produce 21-hydroxy steroids by fermentation processes. Other objects and the advantages of this invention will appear hereinafter.

In accordance with the present invention the oxygenation of steroids is conveniently effected by subjecting steroids to the action of an oxygenating strain of fungi of the species Wojnowicia graminis or to oxygenating enzymes produced by these microorganisms. The practice of this invention is particularly suitable for converting 21-desoxy pregnenes or pregnanes to the corresponding 21-hydroxy pregnene or pregnane in good yields without substantial formation of undesirable side products. Thus, this method provides a valuable means for introducing a 21-hydroxy substituent and thereby preparing hormones such as cortisone and other products suitable as intermediates for the production of compounds related thereto such as hydrocortisone.

The processes of this invention are particularly valuable since the use of fungi of the species Wojnowicia graminis makes possible the introduction, by fermentation procedures, of a 21-hydroxy group. Thus, this invention provides expedient fermentation procedures for the introduction of such a group that was heretofore only possible by involved organic synthesis necessitating a number of separate steps. Another feature of this process is that the action of these microorganisms will introduce oxygen selectively at the 21-position. This is important since it results in the obtainment of much better yields of the desired product and makes possible the use of simpler methods for effecting its recovery. Another important characteristic of these processes is the ability of the organism to grow on and oxidize sterols in a great variety of culture media. Further, the oxygenating species, Wojnowicia graminis is very stable and can be lyophilized and stored without affecting its oxygenating characteristics.

The oxygenating strains of the fungi of the species Wojnowicia graminis employed in the process of this invention are of the class Fungi Imperfecti of the order Sphaeropsidales (Phomales), the family Sphaeroidaceae and the genus Wojnowicia.

These microorganisms can be obtained from known sources such as the Northern Regional Research Laboratories, Peoria, Illinois, under numbers NRRL 2472. Alternately strains can be obtained from soil using techniques known to microbiologists.

In carrying out the process of this invention the steroid to be oxygenated is subjected to the action of an oxygenating enzyme produced by growing an oxygenating strain of fungi of the species Wojnowicia graminis. This is conveniently accomplished by growing the microorganism under aerobic conditions in a suitable nutrient medium in intimate contact with the steroid to be oxygenated; the culturing growth of the microorganism being continued until the desired oxygenation has occurred. Alternately the process is effected by the use of homogenized resting cells by first growing the microorganism in a suitable fermentation medium under aerobic conditions, then separating the cells from the fermentation medium and finally adding the steroid to these resting cells and continuing the aerobic conditions for sufficient time to effect the desired oxygenation. The use of resting cells has the advantage of simplifying the recovery procedure.

The steroid can be added to the nutrient medium as a suspension in a suitable solvent such as water, as a solution in a solvent such as acetone, propylene glycol, dimethylformamide or dimethylacetamide, or in a finely divided form such as a solid micronized powder. In general, it is desirable that the steroid be present in very finely divided form in order to permit maximum contact with the oxygenating culture medium and insure completion of the reaction. All of the steroid may be added at one time or the addition may be continuous or intermittent over a period of time.

The processes of the present invention can be effected in both stationary and submerged cultures of Wojnowicia graminis growing under aerobic conditions, although for practical purposes it is most conveniently carried out by growing the microorganism under submerged conditions in a suitable aqueous fermentation medium containing the steroid. The amount of the steroid which can be conveniently oxygenated by our method will depend in part upon the particular medium employed.

Aqueous nutrient mediums suitable for the growing of oxygenating strains of Wojnowicia graminis must contain sources assimilable carbon and nitrogen as well as minor amounts of inorganic salts. Any of the usual sources of assimilable carbon such as dextrose, cerelose, glucose, inverted molasses, and the like, employed in fermentation mediums can be used in carrying out the process of our invention. Similarly, complex sources of nitrogen usually employed in commercial fermenation process such as lactalbumin digest ("Edamine") and corn steep liquor, or inorganic sources of nitrogen such as dibasic ammonium phosphate, ammonium nitrate, and the like, are satisfactory for use in the fermentation mediums. Minor amounts of other substances such as nicotinamide or inorganic salts such as suitable soluble salts of magnesium, zinc, potassium, sodium, phosphorous, and iron are usually available in complex sources of carbon and nitrogen or may be conveniently added to the fermentation medium in minor amounts to promote maximum growth of the oxygenating microorganism.

The following are examples of suitable aqueous nutrient mediums which can be used in our process of oxygenating steroids:

Medium No. 1

|  | G. |
|---|---|
| Commercial dextrose (Cerelose) | 50.00 |
| Commercial lactalbumin digest (Edamine) | 20.00 |
| Corn steep liquor | 5.0 |

Distilled water is added to give a total volume of 1 liter of nutrient medium and the pH adjusted to 6.5 with sodium hydroxide.

Medium No. 2

| Inverted blackstrap molasses | 100.0 |
|---|---|
| Commercial lactalbumin digest (Edamine) | 20.0 |
| Corn steep liquor | 5.0 |

Distilled water is added to give a total volume of 1 liter of nutrient medium and the pH adjusted to 6.5 with sodium hydroxide.

Medium No. 3

| Inverted blackstrap molasses | 100.0 |
|---|---|
| Corn steep liquor | 5.0 |

Distilled water is added to give a total volume of 1 liter of nutrient medium and the pH adjusted to 6.5 with sodium hydroxide.

Medium No. 4

| Inverted blackstrap molasses | 100.0 |
|---|---|
| Corn steep liquor | 20.0 |

Distilled water is added to give a total volume of 1 liter of nutrient medium and the pH adjusted to 6.5 with sodium hydroxide.

Medium No. 5

| Inverted blackstrap molasses | 50.0 |
|---|---|
| Corn steep liquor | 6.3 |

Distilled water is added to give a total volume of 1 liter of nutrient medium and the pH adjusted to 6.5 with sodium hydroxide.

Medium No. 6

| Dextrose | 50.0 |
|---|---|
| $(NH_4)_2HPO_4$ | 7.5 |
| $K_2HPO_4$ | 1.0 |
| $MgSO_4 \cdot 7H_2O$ | 0.5 |
| KCl | 0.5 |
| $FeSO_4 \cdot 7H_2O$ | 0.01 |
| $ZnSO_4 \cdot 7H_2O$ | 0.01 |

Distilled water is added to give a total volume of 1 liter of nutrient medium and pH adjusted to 6.5 with sodium hydroxide.

Medium No. 7

| Cuban blackstrap inverted molasses | 50.0 |
|---|---|
| Corn steep | 5.0 |

Distilled water is added to give a total volume of 1 liter of nutrient medium and pH adjusted to 5.9 with sodium hydroxide.

Medium No. 8

| Cuban blackstrap inverted molasses | 100.0 |
|---|---|
| Corn steep | 5.0 |

Distilled water is added to give a total volume of 1 liter of nutrient medium and the pH adjusted to 5.8 with sodium hydroxide.

The addition of minor amounts of anti-foaming agents, although not essential, is desirable with some fermentation mediums. It has been found that the addition to certain fermentation mediums of a substituted oxazaline which is a nonvolatile, amine-type, cationic surface active agent available under the trade name Alkaterge C is particularly effective in reducing the amount of foam, although other antifoam agents known to be useful for this purpose can also be used.

As indicated above, the process of this invention is particularly useful in the oxygenation of 21-desoxy pregnenes or pregnanes to obtain the corresponding 21-hydroxy pregnene or pregnane. Other steriods, however, may be oxygenated thereby producing suitable intermediates in the preparation of hormones. Thus, this process is applicable in general to saturated and unsaturated cyclopentanopoly - hydrophenanthrene compounds. Such cyclopentanopolyhydrophenanthrene compounds may be unsubstituted or may contain substituents such as keto hydroxyl, acyloxy, halide, alkyl, and the like at various positions of the cyclopentanopolyhydrophenanthrene nucleus. In addition, such compounds may have at the 17-position, a ketol side chain, a saturated or unsaturated hydrocarbon side chain, a carboxylic acid side chain, and the like. Examples of classes of such cyclopentanopolyhydrophenanthrene compounds that might be mentioned are pregnanes, pregnenes, including pregnadienes, allopregnanes and derivatives thereof. Thus, representative 21-desoxysteroids such as progesterone; 4-pregnene-17α-ol-3,20-dione; 4-pregnene-17α-ol-3,20-dione; 4-pregnene-3β-ol-20-one; 5,6-dichloropregnane-3β-ol-20-one; 5,6-dichloropregnane-3,20-dione; 5,6-dichloropregnane-17α,3,20-dione; 4-pregnene-11α, 17α-diol-3,20-dione; 4-pregnene-11α-ol-3,20-dione; 4-pregnene-17α-ol-3,11,20-trione; 4-pregnene-11,17α-diol-3,20-dione; pregnane-3,11,20-trione; pregnane17α-ol-3,11,20-trione; 1,4-pregnadiene-11,17α-diol-3,20-dione and the like, can be oxygenated at position 21 to obtain the corresponding 21-hydroxy derivatives.

For example, a 21-desoxypregnene can be oxygenated in accordance with the following procedure:

A sterile culture medium, such as those shown above, is first inoculated by introducing a small amount of spore suspension or vegetative growth of an oxygenating strain of *Wojnowicia graminis*. The inoculated nutrient medium is then incubated at a temperature of about 20–45° C., while being agitated in the presence of oxygen for a period of about a few hours to several days. At this point, a solution of a 21-desoxypregnene in a solvent such as propylene glycol is added to the fermentation medium and the agitation and aeration of the nutrient medium continued for about 5 to 30 hours, or until the oxygenation reaction is completed.

When the oxygenation is complete, the oxygenated steroid may be recovered from the fermentation broth by extraction with a suitable water immiscible organic solvent for the oxygenated steroids. Suitable solvents for this purpose that might be mentioned are chloroform, methylene chloride, 2-methyl-5-ethyl pyridine, organic acid esters, aromatic hydrocarbons, ketones and amides, and the like. The solvent solution containing the desired oxygenated steroid can then be evaporated to yield the desired product which may be further purified by recrystallization or other procedures conventional in the art.

Alternatively, the process of this invention can be effected by contacting the oxygenating enzymes produced by the fermentation of *Wojnowicia graminis* with the steroid to be oxygenated. This can be accomplished by recovering the oxygenating enzymes from a fermentation broth in accordance with procedures known in the art, and intimately contacting such enzymes with a steroid in an aqueous medium.

The following examples are given for purpose of illustration.

EXAMPLE 1

Approximately 50 ml. of a culture medium having the composition described as medium #1 was sterilized for 20 minutes at 120° C. in a 250 ml. flask. The medium was then inoculated with approximately 3 ml. of a vegetative growth of a culture of *Wojnowicia graminis*. The mixture was agitated using a rotary shaker at an agitation speed of 220 R. P. M. for approximately 72 hours while maintaining the temperature at 28° C. At the end of the 72 hour period a sterile solution of approximately 10 mg. of 4-pregnene-13,20-dione in 2.5 ml. of propylene glycol was added to the fermented medium and aeration and agitation continued at the same rate for approximately 24 hours. Following the oxidation cycle, the steroid-containing fermented medium was sterilized and the batch was filtered and then extracted with ethyl acetate and the concentrated extract was spotted on paper and developed in the chloroform-formamide system according to the method of Zaffaroni et al. reported in Science III, 6 (1950). A spot was obtained which had the mobility of an authentic sample of 4-pregnene-21-ol-3, 20-dione.

EXAMPLE 2

A procedure similar to Example 1 was followed, except that in place of the 10 mg. of 4-pregnene-3,20-dione a 4 mg. sample of 4-pregnene-11α-ol-3,20-dione was added and the fermentation continued for 48 hours instead of 24 hours. The product gave a spot in the region of 4-pregnene-11α,21-diol-3,20-dione.

EXAMPLE 3

A procedure similar to Example 1 was followed, except in place of the 10 mg. of 4-pregnene-3,20-dione a 10 mg. sample of 4-pregnene-11β-ol-3,20-dione was added and the fermentation continued for 48 hours. The product gave a spot in the region of 4-pregnene-11β,21-diol-3,20-dione.

EXAMPLE 4

A procedure similar to Example 1 was followed, except in place of the 10 mg. of 4-pregnene-3,20-dione a 10 mg. sample of 4-pregnene-11β,17α-diol-3,20-dione was added and the fermentation continued for 48 hours. The product gave a spot in the region of 4-pregnene-11β,17α, 21-triol-3,20-dione.

EXAMPLE 5

A procedure similar to Example 1 was followed, except in place of the 10 mg. of 4-pregnene-3,20-dione a 10 mg. sample of 4-pregnene-17α-ol-3,20-dione was added and the fermentation continued for 48 hours. The product gave a spot in the region of 4-pregnene-17α,21-diol-3,20-dione.

EXAMPLE 6

A procedure similar to Example 1 was followed with two individual samples of 10 mg. of 4-pregnene-3,20-dione. The two samples were fermented for periods of 48 hours and 72 hours respectively. The samples were extracted from the fermented medium with ethyl acetate and the extract papers chromatographed in a ligroin-propylene glycol system. This procedure yielded spots on the papergram indicating a product which had the mobility of 4-pregnene-21-ol-3,20-dione and which reduced tetrazolium (indication of 20-keto-21-hydroxy steroid) and gave an iodine-potassium iodide test similar to that given with desoxycorticosterone. The material eluted from the papergram gave an ultraviolet spectrum in concentrated sulfuric acid identical with that of 4-pregnene-21-ol-3,20-dione.

EXAMPLE 7

Four samples of approximately 50 ml. of a culture medium having the composition described as medium #7 were sterilized for 20 minutes at 120° C. The mediums were then each inoculated with approximately 5 ml. of a vegetative growth of culture *Wojnowicia graminis*. The samples were agitated using a rotary shaker at an agitation speed of 220 R. P. M. while maintaining the temperature at 28° C. for approximately 72 hours. A sterile solution of 10 mg. of 4-pregnene-3,20-dione in 2.5 ml. propylene glycol was added to each of the four samples. The agitation and aeration of the four samples was continued for periods of 24, 48, 60 and 72 hours. The samples were then autoclaved and the cells separated from the broths. Each broth was extracted three times with three 25 ml. portions of chloroform. The cells of each sample were separately washed with two 25 ml. portions of acetone and the acetone portions added to each chloroform portion. The extract of each sample was then dried at room temperature, extracted with methanol and then spotted on Whatman #1 paper. Chromatograms were developed by a system using propylene glycol to saturate the paper and n-heptane as the mobile phase. The unreacted 4-pregnene-3,20-dione and conversion products were located by use of a U. V. scanner, the products eluted with methanol and the optical density determined at 2400° A. The results indicate that 4-pregnene-3,20-dione was converted to 4-pregnene-21-ol-3,20 dione.

EXAMPLE 8

Four samples of approximately 50 ml. of a culture medium having the composition described as medium #8 were sterilized for 20 minutes at 120° C. The mediums were then each inoculated with approximately 5 ml. of a vegetative growth of culture *Wojnowicia graminis*. The samples were agitated using a rotary shaker at an agitation speed of 220 R. P. M. while maintaining the temperature at 28° C. for approximately 72 hours. A sterile solution of 10 mg. of 4-pregnene-3,20-dione in 2.5 ml. of propylene glycol was added to each of the four samples. The agitation and aeration of the four samples was continued for periods of 24, 48, 60 and 72 hours. The samples were then autoclaved and the cells separated from the broths. Each broth was extracted three times with three 25 ml. portions of chloroform. The cells of each sample were separately washed with two 25 ml. portions of acetone and added to each chloroform portion. The extract of each sample was then dried at room temperature, extracted with methanol and then spotted on Whatman #1 paper. Chromatograms were developed by a system using propylene glycol to saturate the paper and n-heptane as the mobile phase. The unreacted 4-pregnene-3,20-dione and conversion products were located by use of a U. V. scanner, the products eluted with methanol and the optical density determined at 2400° A. The results indicate that 4-pregnene-3,20-dione was converted to 4-pregnene-21-ol-3,20-dione.

EXAMPLE 9

Fifty-nine samples of approximately 50 ml. each of a culture medium having the composition described as medium #7 but having a pH of 7.5 were sterilized for 30 minutes at 120° C. Each medium was then inoculated with approximately 5 ml. of a vegetative growth of culture *Wojnowicia graminis*. The inoculated flasks were then agitated on a rotary shaker at a speed of 220 R. P. M. while maintaining the temperature at 27 to 28° C. for approximately 96 hours. A sterile solution of 10 mg. of 4-pregnene-3,20-dione in 2.5 ml. of propylene glycol was added to each flask of growth mediums and the agitation continued for 48 hours. The whole broth from the flask was then pooled and extracted with ethyl acetate. The extract residue was partitioned between petroleum either and 70% aqueous ethanol. The aqueous ethanolic fraction was washed with petroleum ether, concentrated in vacuo, and extracted with chloroform. The extract residue was dissolved in benzene and chromatographed on a silica gel column. The column was eluted with benzene (Cuts 1–5), 5% ethyl acetate in benzene (Cuts 6–10), 25% ethyl acetate and benzene (Cuts 11–16), ethyl acetate (Cuts 17–23), 50% acetone in benzene (Cuts 24–25) followed by acetone. Paper chromatography of the eluted fractions in a ligroin-propylene glycol system showed that Cuts 17, 18 and 19 contained 4-pregnene-21-ol-3,20-dione and a more polar component. Cut 17 was further purified by paper chromatography. The material with the correct mobility was eluted with methanol. The residue from the methanol was dissolved in chloroform, was wet with water, and evaporated to dryness. Recrystallization of the product from ethyl acetate-petroleum either yielded crystals of pure 4-pregnene-21-ol-3,20 dione, M. P. 138–141°, identical with an authentic sample.

Any departure from the above description which conforms to the present invention is intended to be included within the scope of the claims.

What is claimed is:

1. A process for the production of oxygenated steroids, which comprises subjecting a 21-desoxy steroid selected from the group consisting of pregnenes, pregnanes and allopregnanes under aerobic conditions to the action of an oxygenating enzyme produced by an oxygenating strain of a microorganism of the species *Wojnowicia graminis* to produce the corresponding 21-hydroxy steroid.

2. The process of claim 2 wherein the 21-desoxy steroid is 4-pregnene-11α-ol-3,20-dione.

3. The process of claim 2 wherein the 21-desoxy steroid is 4-pregnene-11β-ol-3,20-dione.

4. The process of claim 2 wherein the 21-desoxy steroid is 4-pregnene-11β,17α-diol-3,20-dione.

5. The process of claim 2 wherein the 21-desoxy steroid is 4-pregnene-17α-ol-3,20-dione.

6. The process of claim 2 wherein the 21-desoxy steroid is 4-pregnene-3,20-dione.

7. A process for the producing of oxygenated steroids which comprises subjecting a 21-desoxypregnene under aerobic conditions to the action of an oxygenating enzyme produced by an oxygenating strain of a microorganism of the species *Wojnowicia graminis* to produce the corresponding 21-hydroxy steroid.

8. A process for the producing of oxygenated steroids which comprises subjecting a 21-desoxypregnane under aerobic conditions to the action of an oxygenating enzyme produced by an oxygenating strain of a microorganism of the species *Wojnowicia graminis* to produce the corresponding 21-hydroxy steroid.

9. A process which comprises growing an oxygenating strain of a microorganism of the species *Wojnowicia graminis* in an aqueous nutrient medium containing sources of assimilable carbon and nitrogen under aerobic submerged conditions in intimate contact with a 21-desoxy steroid selected from the group consisting of pregnenes, pregnanes and allo-pregnanes to produce the corresponding 21-hydroxy steroid.

10. A process which comprises growing an oxygenating strain of a microorganism of the species *Wojnowicia graminis* under aerobic conditions in an aqueous medium comprising assimilable sources of carbon and nitrogen and a 21-desoxy steroid selected from the group consisting of pregnenes, pregnanes and allopregnanes and isolating a 21-hydroxy steroid from the resulting fermentation broth.

11. A process which comprises growing an oxygenating strain of a microorganism of the species *Wojnowicia graminis* under aerobic conditions in an aqueous nutrient medium comprising dextrose, lactalbumin digest and corn steep liquor in intimate contact with a 21-desoxy steroid selected from the group consisting of pregnenes, pregnanes and allopregnanes to produce the corresponding 21-hydroxy steroid.

References Cited in the file of this patent

Meystre et al.: Helvetica Chimica Acta, 37 (1954), pages 1548–1553.